United States Patent [19]

Hogan

[11] Patent Number: 5,557,516
[45] Date of Patent: Sep. 17, 1996

[54] SYSTEM AND METHOD FOR CONDUCTING CASHLESS TRANSACTIONS

[75] Inventor: Edward J. Hogan, Bayside, N.Y.

[73] Assignee: MasterCard International, New York, N.Y.

[21] Appl. No.: 191,637

[22] Filed: Feb. 4, 1994

[51] Int. Cl.$^6$ .................................................. G06F 157/00
[52] U.S. Cl. ........................................ 364/406; 364/401 R
[58] Field of Search ..................................... 235/379, 380, 235/383, 492; 364/400, 401, 406, 408

[56] References Cited

U.S. PATENT DOCUMENTS

| | | |
|---|---|---|
| 3,559,175 | 1/1971 | Pomeroy . |
| 3,637,994 | 1/1972 | Ellingboe . |
| 3,935,933 | 2/1976 | Tanaka et al. . |
| 3,941,977 | 3/1976 | Voss et al. ............................ 340/149 R |
| 4,105,156 | 8/1978 | Dethloff . |
| 4,277,837 | 7/1981 | Stuckert . |
| 4,353,064 | 11/1982 | Stamm . |
| 4,582,985 | 4/1986 | Löfberg . |
| 4,605,844 | 8/1986 | Haggan . |
| 4,614,861 | 9/1986 | Pavlov et al. . |
| 4,625,102 | 11/1986 | Rebjock et al. ........................ 235/492 |
| 4,650,981 | 3/1987 | Foletta . |
| 4,669,596 | 6/1987 | Capers et al. . |
| 4,697,073 | 9/1987 | Hara . |
| 4,731,575 | 3/1988 | Sloan . |
| 4,757,186 | 7/1988 | Heberle et al. . |
| 4,849,615 | 7/1989 | Mollet ..................................... 235/380 |
| 4,908,502 | 3/1990 | Jackson . |
| 4,973,828 | 11/1990 | Naruse et al. ........................... 235/380 |
| 5,111,030 | 5/1992 | Brasington et al. ..................... 235/375 |
| 5,157,247 | 10/1992 | Takahira . |
| 5,162,638 | 11/1992 | Diehl et al. ............................. 235/380 |

(List continued on next page.)

FOREIGN PATENT DOCUMENTS

| | | |
|---|---|---|
| 0316689 | 5/1989 | European Pat. Off. . |
| 0378454 | 7/1990 | European Pat. Off. . |
| 0402302 | 12/1990 | European Pat. Off. . |
| 0423035 | 4/1991 | European Pat. Off. . |
| 2685520 | 6/1993 | France . |
| 3432557 | 3/1986 | Germany . |
| 91/16691 | 10/1991 | WIPO . |
| WO93/08545 | 4/1993 | WIPO . |

OTHER PUBLICATIONS

"How Prepaid Is Renewing EFT's Standards Debate", Bank Network News v11. N9 p. 2, Sep. 1992.
Paul Abrahams, "Information Technology In Finance": Cost Factor is Crucial, London Section: Survey page:4 IV Nov. 10, 1988.
Morgan, Pat, "Charging through the checkout"; Convenience Store, p. 50(2), May 10, 1991.

Primary Examiner—Gail O. Hayes
Assistant Examiner—Frantzy Poinvil
Attorney, Agent, or Firm—Brumbaugh, Graves, Donohue & Raymond

[57] ABSTRACT

In a commercial transaction system, a system user uses a card device to interact with sales or transaction terminals to conduct cashless transactions. Each terminal processes data including a balance stored on the card device and updates the stored data at the end of the transaction. The system is specially designed for purchases of items or transactions of relatively small monetary value, where purchases are generally unattended by salespersons. In this manner, the amount of the transaction is deducted from the balance on the card device.

In accordance with the invention, when the existing balance associated with the card does not cover the price of the transaction, the system provides an automatic renewal feature which automatically increases the balance of the card device by a predetermined amount. Such a feature allows the purchase to be made without inconveniencing the card user to increase the balance by other means. Each time the balance is increased by an automatic renewal, the card issuing bank bills the card user for increments of the predetermined amount.

54 Claims, 8 Drawing Sheets

U.S. PATENT DOCUMENTS

| | | |
|---|---|---|
| 5,166,503 | 11/1992 | Mizuta . |
| 5,182,442 | 1/1993 | Takahira . |
| 5,206,488 | 4/1993 | Teicher . |
| 5,212,373 | 5/1993 | Fujioka et al. . |
| 5,225,667 | 7/1993 | Furuta et al. . |
| 5,264,689 | 11/1993 | Maes et al. ............................. 235/492 |
| 5,274,221 | 12/1993 | Matsubara . |
| 5,293,030 | 4/1994 | Dietrich et al. ........................ 235/381 |
| 5,380,991 | 1/1995 | Valencia et al. ........................ 235/383 |

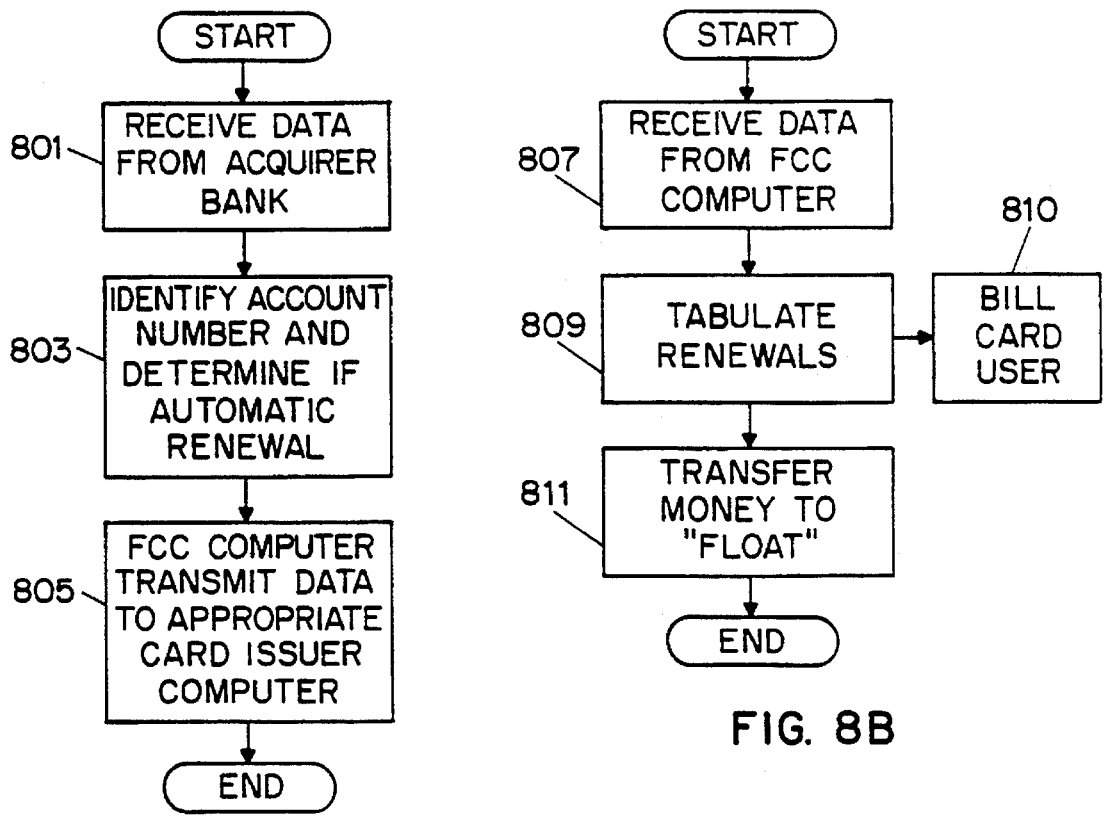
FIG. 8A
FIG. 8B
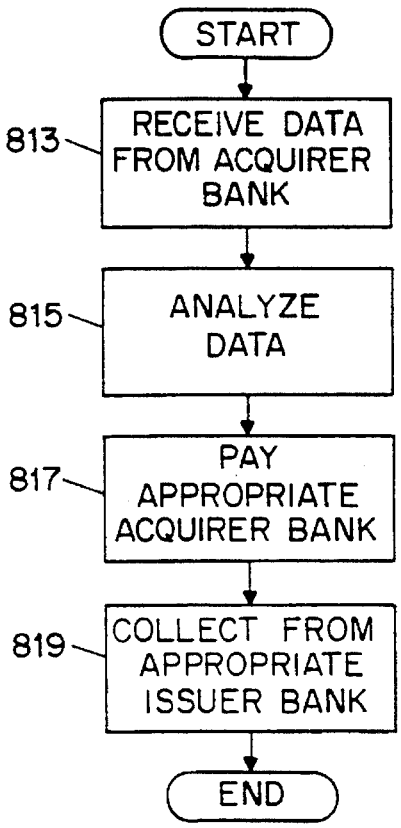
FIG. 8C

MONTHLY MASTERCARD STATEMENT

Ref # XXXXXXX 4/22   Macy's NY NY   $75.00

MasterCash
Apr. 25, 1993

4/27  $2.00  Merch.
4/27  $2.00  Parking
4/28  $2.00  Vending
4/29  $3.00  Transp.
4/30  $3.00  Transp.

| 4/25 | $2.00 | Vending |
| 4/26 | $3.50 | Transp |
| 4/26 | $6.50 | Toll |
| 4/26 | $1.00 | Vending |

SYSTEM AND METHOD FOR CONDUCTING CASHLESS TRANSACTIONS

TECHNICAL FIELD

The present invention relates to a commercial transaction system and method and particularly to a system and method for conducting commercial transactions of small monetary value without using cash.

BACKGROUND OF THE INVENTION

Presently, a customer must physically carry some change or small bills in order to conduct day-to-day transactions including paying vending machines, parking meters, laundry machines, toll machines, transportation fares, etc. for respective products and services. This can be very inconvenient for the customer if he/she is not carrying enough small currency or does not have exact change in some circumstances. For example, when a potential purchaser of a soda from a vending machine is out of change or dollar bills to make the purchase, the potential purchaser must then get change from larger bills from another source or forgo the purchase all together. This is a problem both for the purchaser who is inconvenienced and the vendor who may lose a sale.

Attempts have been made to develop a system that would obviate the need to carry around a large amount of change and small bills. One such system is a pre-paid money card that is debited each time it is used. A subway system such as the Washington D.C. Metro system utilizes such pre-paid fare cards. A commuter purchases the card with a certain monetary value stored on it. The card is debited for an amount based on the distance traveled until the balance falls below the cost of the necessary fare.

While the above system does overcome the need to carry tokens or change on a constant basis for commuters, it has some significant disadvantages. For example, when a commuter discovers that the fare level stored on the card is not sufficient to pay for the required fare at a turnstile, the commuter must inconveniently go to a different, specified location to increase the balance on the card with additional money. The specified location may be either a machine or a human teller, and long lines can form at such a location during rush hours, which might further delay the commuter. Another disadvantage is that the fare cards can only be used in a closed system which in this case is the metro system and cannot be utilized by the card user outside the system to freely spend his pre-paid amount. Finally, any money left on the card unspent is not credited back to the card user and may be eventually lost at the expense of the user.

Another example of a cashless transaction system is one involving a university dining card. A certain amount of money is purchased on the card at the beginning of each semester to be used to purchase food or other items. The student then has his/her card debited for each purchase made at a university food concession or store. This eliminates the need for the student to carry around small bills and change in order to eat. It also allows the student to use the same card for a variety of food places.

However, the university dining arrangement suffers similar disadvantages to those of the subway system. The arrangement is also a closed system in that the card only works within the university. In addition, the student must purchase a large dollar amount on the card in advance and is restricted to use the money for food or other university items only. When the balance on the student's card is depleted, he/she again must go to a specified location other than the location of a transaction or point-of-sale (POS) to purchase additional credit on the card.

Still another example of a cashless transaction is one involving credit cards where credit is extended to a cardholder by a financial institution to cover purchases from participating merchants. The financial institution pays the merchant the purchase price less a service charge fee and later bills the cardholder for the purchase price.

Such credit card transactions, however, need to be attended by a salesperson who normally makes an imprint of the credit card, calls a processing center via a dial-up modem to obtain authorization, and verifies the cardholder's signature to prevent fraud. This involves significant transaction costs, which while acceptable for large purchases, is not cost effective for relatively small purchases (e.g., a can of soda from a vending machine).

Another system that allows for purchases without use of cash is a debit card system. A chain of retail stores may permit processing of a debit card which, unlike the processing of a credit card, results in immediate electronic debit of the user's bank account. A user normally provides the retailer with the debit card which is magnetically read using a "swipe" type magnetic reader. The user is then asked by the merchant to secretly key in his/her personal identification number (PIN) into a keyboard, and the merchant keys in the amount of the purchase. A POS debit request digital message is then transmitted either directly over an ATM network (or indirectly via a dial-up telephone link to a central computer) for receipt by the user's bank. The bank transmits a confirmation message to the POS terminal over the ATM network which, when received, assures the merchant that the funds are available and have been transmitted to the merchant's account.

Disadvantages associated with a debit card system are that the card user usually has to maintain a minimum balance in the account in order to use the card, and may be required to pay bank fees for such an account. The debit card user also has to check the account balance from time to time to ensure sufficient funds to cover his future purchases. Otherwise, the card user could be charged for any over-draft. Finally, like a credit card transaction, a debit card transaction incurs significant transaction costs resulting in part from the requirements of having a salesperson attend the sales. As such, the debit card system is again not cost-effective for relatively small purchases.

Still another system for conducting cashless transactions is disclosed in PCT International Publication No. WO 91/16691 published Oct. 13, 1991. The disclosed value transfer system comprises a computer, a value meter and a bulk purse within a bank, and exchange devices and electronic purses (e.g., integrated circuit cards or smart cards) outside the bank. In accordance with the disclosure, the bulk purse is capable of having cash values loaded to and redeemed by electronic purses via a value meter. The electronic purses communicate with each other through an exchange device to transfer values in transactions which are off-line from the computer. The value meter keeps float value records for the computer to derive a net value released to the bulk purse. Each float value record is non-specific with regard to individual draw-downs and redemptions. This system has obvious disadvantages: the holder of an electronic purse must connect to a bank via computer to increase his/her monetary level stored in the electronic purse. Therefore, if a user purchases an item without sufficient funds in the purse, he/she could not immediately purchase the item. The user would still need to go on-line with the bank to reload the purse and then complete the transaction.

Accordingly, it is desirable to have a cost-effective and efficient system whereby a card user can conduct transactions of relatively small values without using cash, without worrying whether the card has sufficient funds, and without timely interruptions for verification, authorization, and/or obtaining additional funds on the card.

SUMMARY OF THE INVENTION

The present invention preferably includes an automatic renewal feature which will automatically increase the balance associated with a user's financial card (or storage device) of a particular financial card company ("FCC") at the time of the transaction without interruption, and specifically without requiring the user to obtain separately—prior to consummation of the transaction—an increase in the funds allocated to his or her card.

The cashless system preferably includes (1) a storage device for system users (e.g., an integrated circuit card or credit card with magnetic stripe), and (2) sales or transaction terminals (e.g., a soda or toll machine) which accept the storage device and which include a microprocessor located within the terminal which can read, compare, and write back data to the storage device.

In operation, an issuing bank issues the storage device card to a user with a predetermined value, e.g. $25. The user may use that card to complete a cashless transaction of a relatively small amount. For example, to purchase a soda the user will insert the card at the sales/transaction terminal (i.e., soda machine) and the amount of the transaction will be deducted from the balance on the card device. If the balance on the card is less than the transaction amount, the balance will automatically be renewed by the terminal, that is increased by a predetermined amount. In this manner, if the user has only a $1.00 balance remaining on the card and the transaction amount is $1.50, the user's card will be increased a set amount, e.g. $25.00. The new net card balance will be $24.50, taking into account the amount previously remaining on the card and the transaction amount.

Upon automatic renewal, the issuing bank (which has been informed of the automatic renewal by the FCC) bills the customer for the increase and preferably places the increased amount into a separate account out of which the amount of the transaction is withdrawn. That separate account ("Pooled Account") holds all outstanding prepaid revenues for all customers of the issuer bank. If no charges are made in a pre-specified time, the FCC may direct the issuing bank to reimburse a particular cardholder for his or her unspent balance.

In accordance with one aspect of the invention, operators of the sales/transaction terminals are paid by submission of transaction information to the acquirer bank which advances the transaction amount (possibly less a transaction fee). The acquirer bank then preferably transmits the transaction information to the FCC which pays the acquirer bank and which informs the issuer bank to reimburse it (the FCC) out of the Pooled Account.

BRIEF DESCRIPTION OF THE DRAWINGS

Further objects, features and advantages of the invention will become apparent from the following detailed description taken in conjunction with the accompanying figures showing a preferred embodiment of the invention, on which:

FIG. 8A is a flow chart illustrating a process in the financial card company computer of FIG. 3.

FIG. 8B is a flow chart illustrating a process in the card issuer computer of FIG. 3.

FIG. 8C is a flow chart illustrating a process in the financial card company computer of FIG. 3.

FIG. 10 illustrates a monthly billing reflecting monthly transactions made using the system of FIG. 3.

Figure 1A:
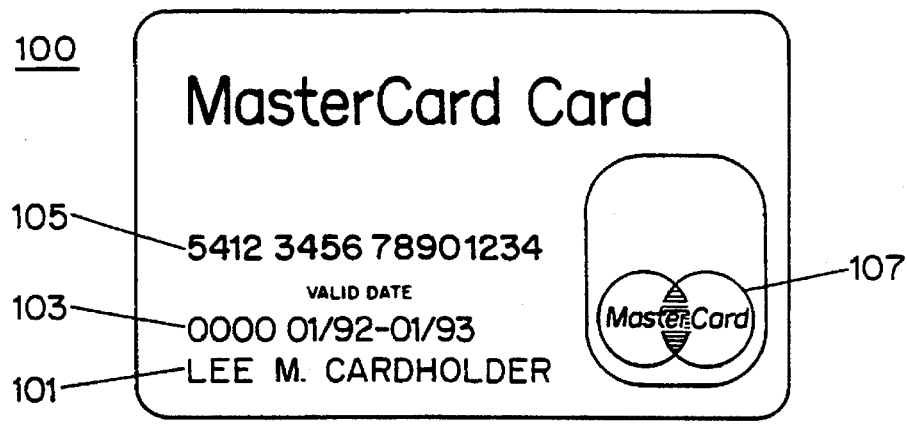
FIG. 1A illustrates one side of a financial card incorporating integrated circuit technology in accordance with the invention.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION

The present invention is directed to a technique for conducting cashless transactions using a financial card. In this particular illustrative embodiment, the financial card takes the form of a conventional integrated circuit (IC) card, which typically contains a programmable read-only-memory (PROM).

FIG. 1A provides a front view of financial card 100 which looks similar to a conventional credit card. In accordance with the invention, financial card 100 can be used as a credit card as well as a card for conducting cashless transactions involving relatively small monetary value. Like the conventional credit card, located on the face of financial card 100 in raised characters are card user's name 101, card account number 105 and expiration date 103. Also located on its face is logo 107 of a financial card company (i.e., MasterCard in this instance) which defines the financial services accompanied by card 100. Card 100 is normally issued to card users by member banks of the financial card company and these card issuer banks are responsible for billing the customers for their purchases.

Figure 1B:
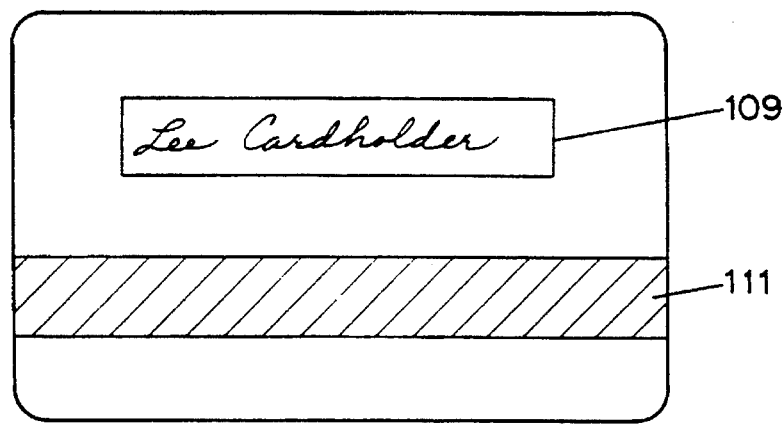
FIG. 1B illustrates the opposite side of the financial card of FIG. 1A.

FIG. 1B provides a back view of card 100. Signature space 109 is provided for a user to sign his/her name. The signature helps vendors to verify that the card user is the person to whom the card was issued. Also present on the back is magnetic stripe 111. The magnetic stripe is currently used for data storage normally needed for conducting a conventional credit card transaction. The conventional transaction typically requires a salesperson to make an imprint of the credit card, scan a magnetic stripe to call a processing center via a dial-up modem to obtain authorization, and verify the card user's signature. The required attendance by a salesperson and the credit extension approval process incur significant transaction costs. As such, the credit card type purchases are not cost-effective for small purchases. As a result, a customer is currently inconvenienced to carry change or small bills in order to conduct such small purchases or transactions as paying vending machines, parking meters, laundry machines, toll machines, etc. Thus an object of the invention is to obviate the need for carrying small currency to conduct these small purchases at the machines or sales/transaction terminals in general.

In accordance with the invention, card 100 can also be used to conduct the small purchases in lieu of cash. Card 100 carries a balance from which the price of the purchase or transaction is deducted. It incorporates the additional convenience of an automatic renewal feature which automatically increases the card balance by a predetermined amount preferably when the purchase price exceeds the running balance. The predetermined amount for renewal should be a relatively small monetary value such as $25. A larger amount is not preferable because it would create significant liabilities arising from fraudulent uses such as uses of lost or stolen cards. By allowing a small number of renewals of a relatively small amount for a limited time period, one can effectively control and contain such liabilities.

Card 100 is issued by issuer bank preferably with a balance of $25. Issuer bank preferably maintains in one account all outstanding prepaid revenues for all customers of the issuer bank, identified above as the Pooled Account. Thus, if issuer bank issues 200 cards with a $25 balance each, the Pooled Account will equal $5,000.

Figure 2A:
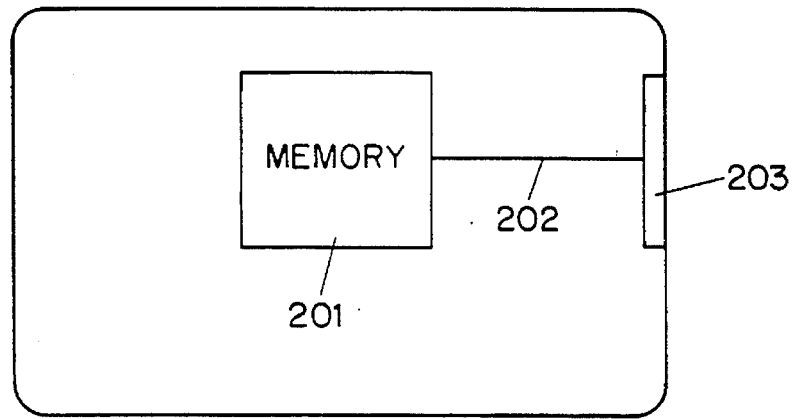
FIG. 2A is a schematic diagram of the financial card of FIGS. 1A and 1B including a memory.

As shown in FIG. 2A, card 100 contains memory 201 for storing data to be described. Memory 201 may be a conventional electrically erasable programmable read-only-memory (EEPROM) capable of fast data programming and erasure, and a large number of program/erase cycles during its lifetime. Leads 202 connect memory 201 to input/output (I/O) interface 203 of conventional design. With this circuit arrangement, when financial card 100 is inserted in a card receptacle at a sales/transaction terminal, data can be transferred between memory 201 and the terminal through I/O interface 203.

Figure 2B:
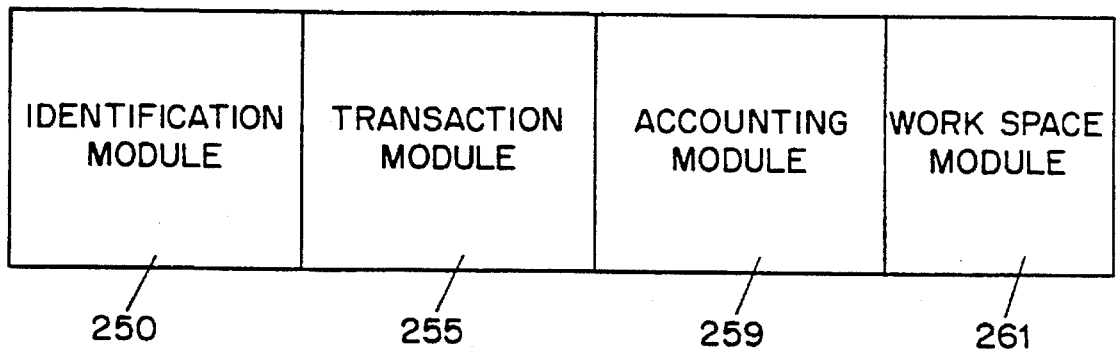
FIG. 2B is a memory map of memory space provided in the financial card of FIGS. 1A and 1B.

FIG. 2B depicts a memory map of data storage in memory 201. The memory map identifies various memory modules including identification module 250 containing data on an account number, a card number, an expiration date, a personal identification number (PIN) and a maximum number of PIN entry attempts; transaction module 255 containing purchase data such as last date and time of purchase, sequence number, amount of purchase and a "credit back" period; accounting module 259 containing the balance data, the number of renewals remaining, and a predetermined "maximum number of renewals"; and work space module 261. All this data is used to identify the account, operate the system, and track the purchase after a transaction is completed.

Specifically, the account number identifies the account associated with card 100 for billing purposes. The card number acts as a subaccount number identifying additional cards issued under the same account number. Thus, for example, a spouse may possess an associated financial card having the same account number but a different card number. Accounting related to such an associated card is handled as if it were an independent card. The expiration date is used to make sure the card is unexpired. The PIN is used to verify the card ownership in a conventional manner. The maximum number of PIN entry attempts is the number of incorrect tries allowed to verify the user before the card is returned. The date and time of purchase keeps track of the date and time of the last transaction. The sequence number identifies which transaction is associated with the balance for possible later tracking. As described below, a "credit back" period is selected by the card user from a set of predetermined time period, e.g., 0, 30, 60, 90 days or until the card expires. If card 100 is not used during the credit back period, an automatic refund of the balance is given to the card user. In the present embodiment, the "credit back" or "non-use" time period selected is 90 days. The period may be preselected by the card issuer or altered at a specified terminal such as an automated cash machine of conventional design.

The "number of renewals" portion of accounting module 259 in memory 201 corresponds to the number of renewals remaining. The "maximum number of renewals" is the maximum number of renewals allocated to the card user. Preferably, if the maximum number is zero, the card user will not be able to use the automatic renewal feature. Setting the maximum number allows the financial card company and card issuer more control over the entire system. Work space module 261 provides temporary memory space for storing data pertaining to on-going transactions.

Figure 3:
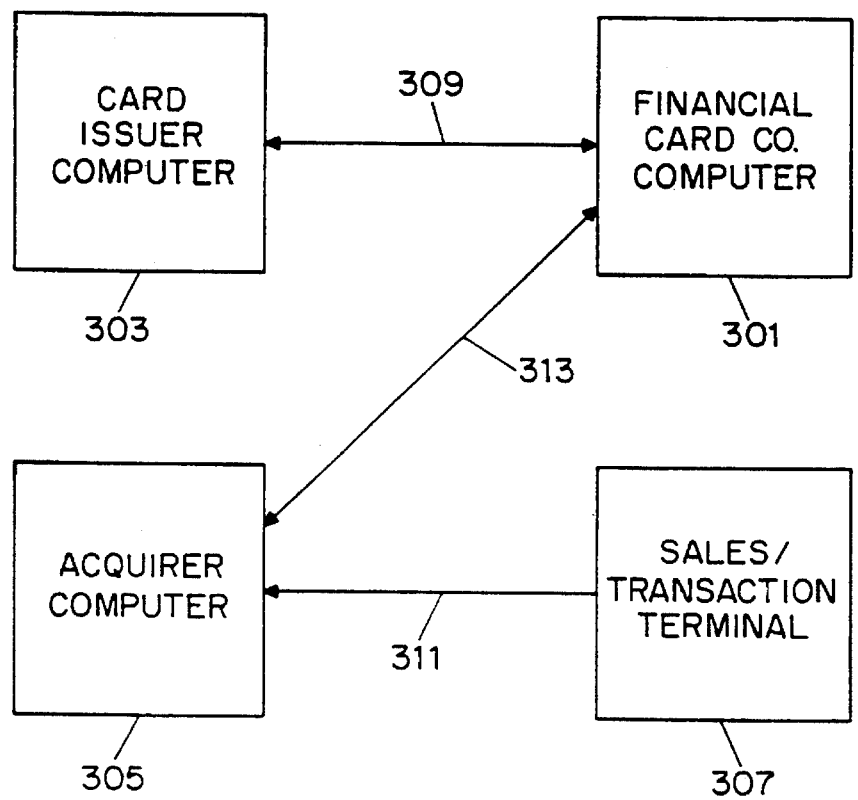
FIG. 3 is a block diagram of a system for conducting cashless transactions with the financial card of FIGS. 1A and 1B in accordance with the invention.

FIG. 3 illustrates system 300 embodying principles of the invention. System 300 includes financial card company computer 301, card issuer computer 303, acquirer computer 305 and sales/transaction terminal 307 which in this instance is a soda vending machine. In order to start a cashless transaction of purchasing a soda with card 100, card 100 is inserted into sales/transaction terminal 307. The terminal then processes the data stored in memory 201 of card 100. It suffices to know at this point that the balance on card 100 is reduced to account for the price of the item purchased. If the balance on card 100 is insufficient to cover the purchase price, and the maximum number of renewals has not been reached, an automatic renewal is triggered by the terminal to increase the balance by $25. Thus, after the purchase is consummated, the net increase in the balance on the card is $25 less the price.

Regarding payments to the operator of the sales/transaction terminal 307, upon submission of transaction information either electronically via transmission line 311 or physically to the acquirer bank, acquirer computer 305 causes advancement of the transaction amount (possibly less a transaction fee) to the terminal operator's account. Acquirer computer 305 then preferably transmits the transaction information (preferably including the account number, card number, expiration date, amount of the transaction, the last card balance, the transaction sequence number and terminal identification code) to FCC computer 301 via transmission line 313. In return, FCC computer 301 reimburses the acquirer bank and communicates with the appropriate card issuer computer 303 via transmission line 309 and instructs the issuer to reimburse it (the FCC) the transaction amount out of the Pooled Account.

FCC computer 301 also calculates whether there was an automatic renewal (which is logically deduced upon comparison between the transaction amount and card balance) and transmits the information regarding any automatic renewal of card 100 to card issuer computer 303 via transmission line 309. Card issuer computer 303 then bills the card user for the $25 renewal and increases the Pooled Account accordingly.

In the event an operator of terminal 307 delays the submission of transaction information to the acquirer bank which in turn delays submission to FCC computer 301, FCC computer 301 will nonetheless process the subsequent transaction, preferably knowing by receipt of the sequence number and last balance that a transaction submission has been delayed.

Figure 4:
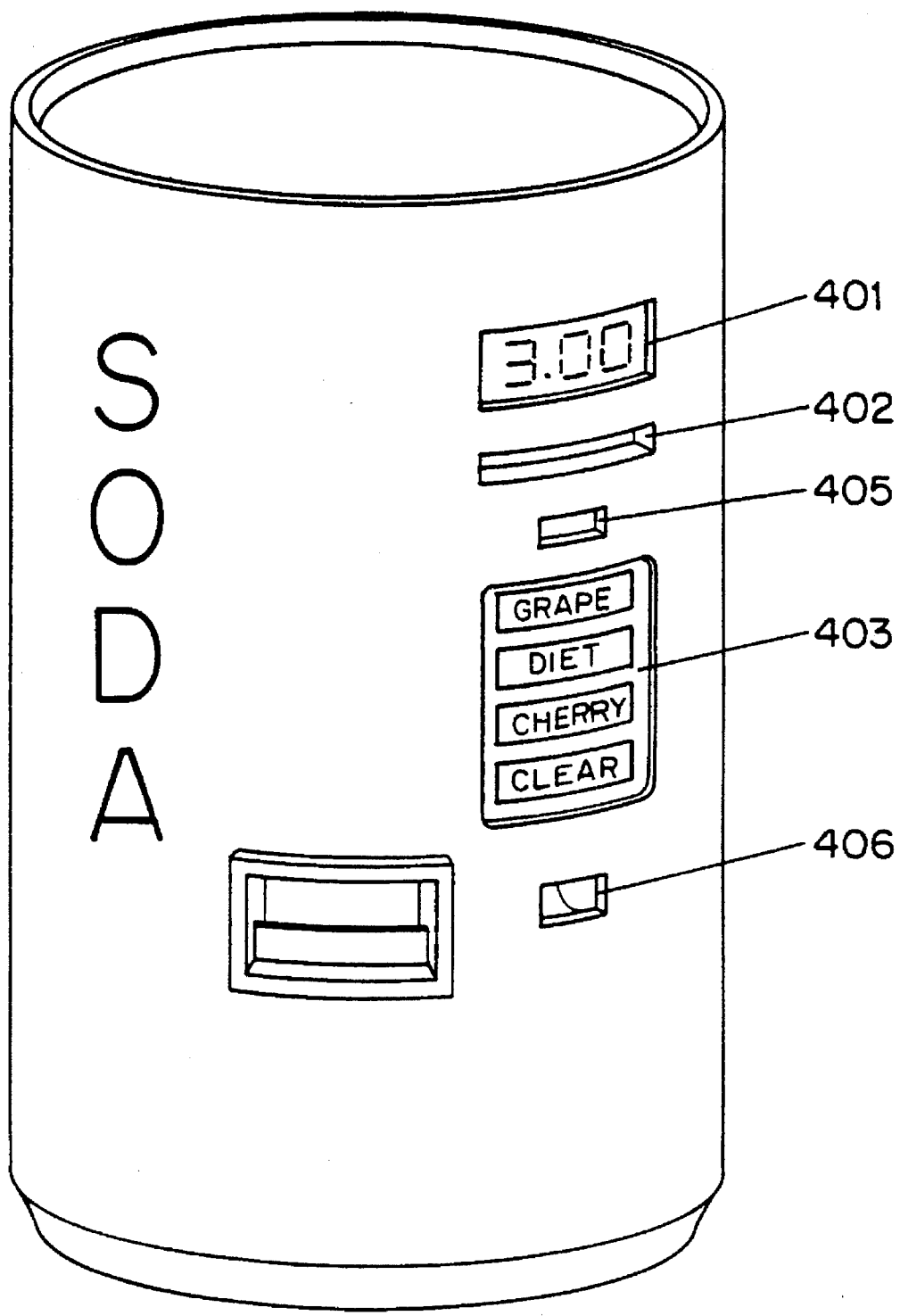
FIG. 4 illustrates a sales/transaction terminal with in system of FIG. 3.

FIG. 4 depicts the outside of sales/transaction terminal 307 which as mentioned before takes the form of a soda vending machine. Terminal 307 comprises display module 401, item selector 403 and card receptacle 402 for receiving card 100. Coin slot 405 and change holder 406, although not required by the invention, may be present as an alternative payment method. When card 100 is inserted in receptacle 402, the balance stored in card 100 may be shown on display module 401. The card user then selects an item using item selector 403 and a transaction process is performed as described below. At the end of the transaction, the new balance stored in card 100 may be shown on display module 401.

Figure 5:
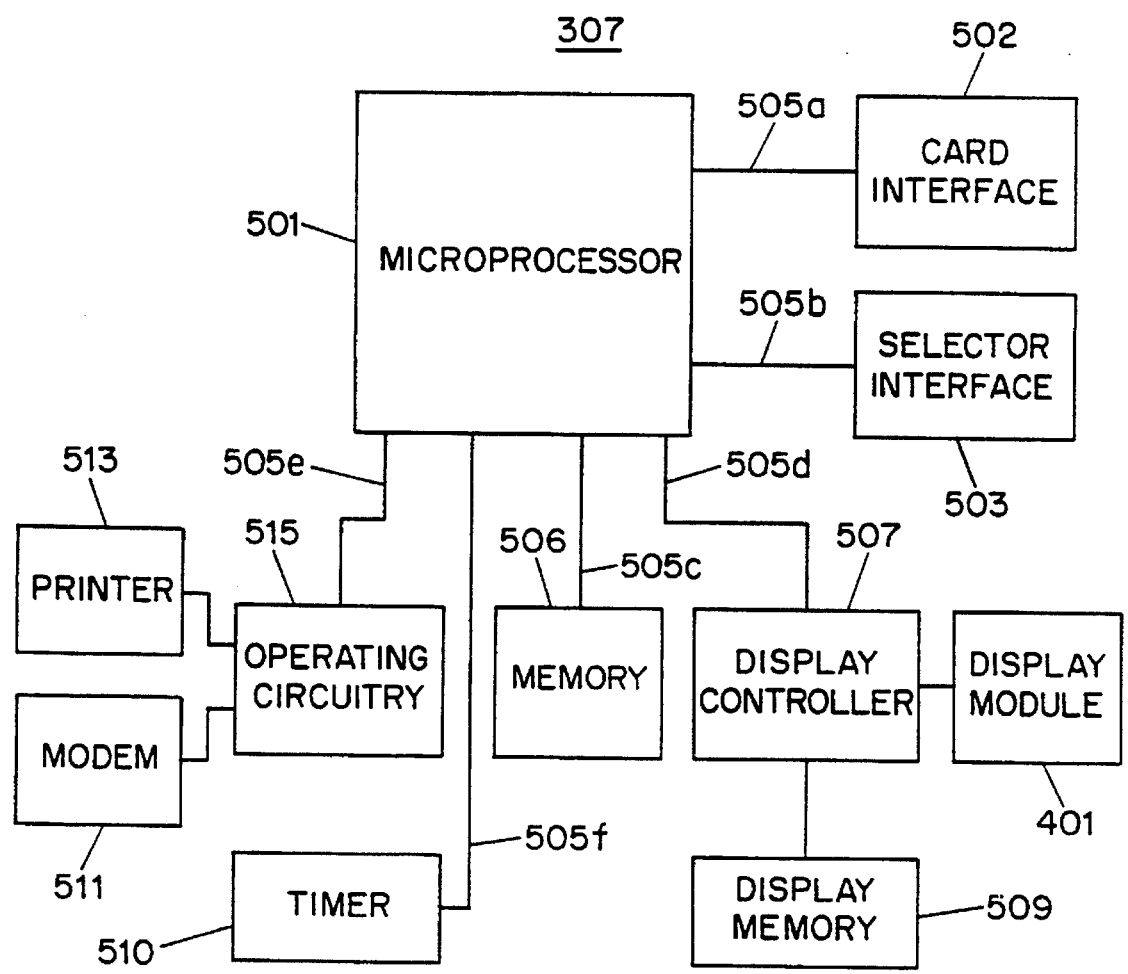
FIG. 5 is a schematic diagram of the sales/transaction terminal of in FIG. 4 including a second memory.

FIG. 5 is a block diagram of sales/transaction terminal 307. Sales/transaction terminal 307 contains microprocessor 501, which performs, inter alia, data retrieval and writing of new data to card 100 when inserted into card receptacle 402. Microprocessor 501 is connected to card interface 502, selector interface 503, display controller 507, memory 506, timer 510 and operating circuitry 515. Leads 505a and leads 505b connect microprocessor 501 to card interface 502 and to selector interface 503, respectively. Leads 505c and leads 505d connect microprocessor 501 to memory 506 and to display controller 507, respectively. Leads 505e and leads 505f connect microprocessor 501 to operating circuitry 515 and timer 510, respectively.

Card receptacle 402 is connected to card interface 502 through which data is retrieved from and written to memory 201. Item selector 403 is connected to selector interface 503 to allow a card user to enter a selection for the desired item. The selector interface indicates to microprocessor 501 any selection made. In a standard way, microprocessor 501 downloads information such as the balance from card 100 to display memory 509 through display controller 507, and causes the controller to display the contents of memory 509 on display module 401. The latter is of conventional design and may be of a liquid crystal display (LCD) type. Other components in terminal 307 include timer 510 used to generate the current date and time which are necessary for transaction identification, expiration and credit back calculations. Modem 511 is used to transmit and receive messages via transmission line 311 to acquirer computer 305. Modem 511 establishes a connection between transmission line 311 and microprocessor 501, and data stored in memory 506 is transferred through modem 511 to acquirer computer 305. Printer 513 may be available to print out the information stored in memory 506 regarding all transactions. Operating circuitry 515 is needed to provide proper interfaces for printer 513 and modem 511, and performs other functions necessary to conduct the sales such as dispensing a soda of the type selected by the card user.

Figure 6:
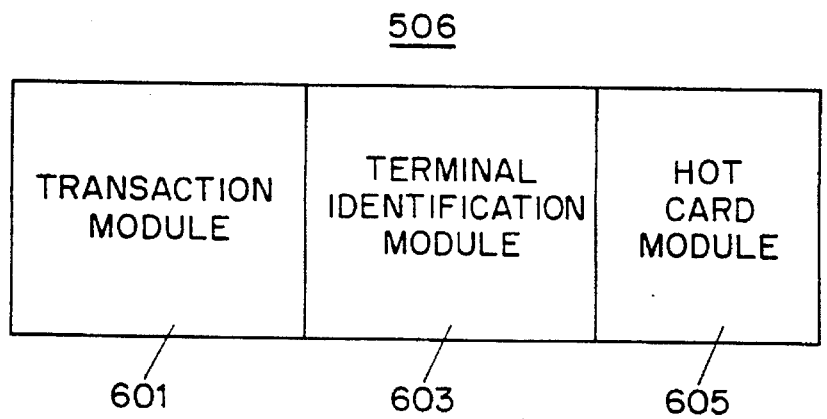
FIG. 6 is a memory map of memory space provided in the sales/transaction terminal of FIG. 5.

FIG. 6 depicts a memory map of data storage in memory 506 of sales/transaction terminal 307. The memory map identifies various modules. Transaction module 601 records purchases made with financial cards like card 100. Card information in transaction module 601 preferably contains a record for each purchase including an account number, card number, expiration date, amount of purchase, date of purchase, transaction sequence and card balance. Terminal identification module 603 includes information about the vendor's name and location of the terminal.

Preferably, the information stored in modules 601 and 603 is later printed out by the operator and forwarded to the acquirer bank for payment. Alternatively, this information may be electronically transmitted to acquirer computer 305. The information is then electronically transmitted from acquirer computer 303 via transmission line 313 to FCC computer 301 to store in a database and for processing. Such information allows FCC computer 301 to identify the card user, vendor and transaction. As explained above, FCC computer 301 reimburses acquirer bank and instructs the appropriate issuer bank to reimburse FCC out of the Pooled Account. If FCC computer 301 also calculates that a renewal was necessary it sends a message to the issuer bank to bill the user's account.

Preferably, terminal 307 contains a hot card module 605, which contains a list of account numbers of stolen, lost, or payment overdue cards. This list of bad accounts allows sales/transaction terminal 307 to identify stolen, lost or payment overdue cards placed in card receptacle 402 and act accordingly as described below. The list is periodically updated.

Figure 7:
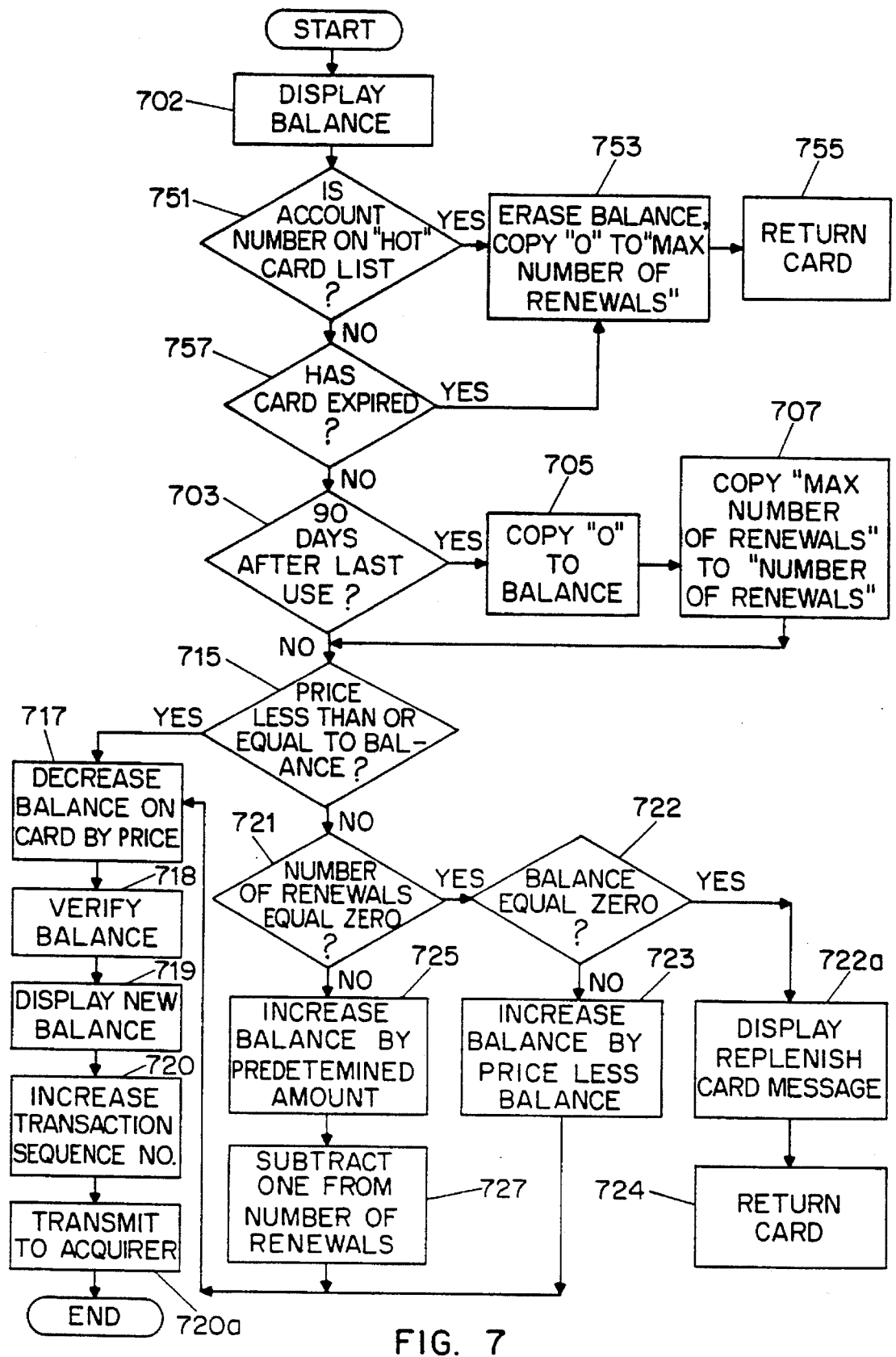
FIG. 7 is a flow chart illustrating a process for conducting a cashless transaction with the system of FIG. 3.

FIG. 7 is a flow chart illustrating the preferable process used in sales/transaction terminal 307 to complete a cashless transaction with the automatic renewal feature in accordance with the invention. The process starts after the card user inserts card 100 into sales/transaction terminal 307. The data stored in memory 201 of card 100 is read by sales/transaction terminal 307 and the balance stored in card 100 is displayed on display module 401, as indicated in step 702. At this point, the card user makes a selection of a purchase item. In this example, the card user selects a soda for the purchase. The items for purchase are stored within terminal 307.

In step 751, the card account number read from memory 203 of card 100 is compared to a list of hot cards stored in memory 506 of terminal 307. If the account number matches a number on the list, the card is presumed invalid and the card is made inactive. In this preferred embodiment, the balance of card 100 is overwritten in step 753 to become zero and the maximum number of renewals is overwritten to become zero. A value is written in the credit back portion of transaction module 255 of memory 201 which represents that no more renewals will be allowed for the life of the card. The basic effect of the values written will be to render the card useless with respect to the cashless system. In the case of the overdue payment, the card 100 can be reactivated when the card user has made the appropriate payment. The card is then returned in step 755 and a suitable message is displayed on display module 401, such as "bad card, card deactivated". Alternatively, if card 100 is identified as a stolen card by an indication on the hot card list, card 100 can be seized by terminal 307 and not returned to the card user, where terminal 307 has such capability.

If the card account number does not match a number on the hot card list, the process goes to step 757. In alternative terminals, the card user may be asked at this point to type in his PIN to identify himself as the owner of card 100. This step is only required in certain circumstances where a larger charge amount is possible (e.g., the sales/transaction terminal being a pay phone), extra security is needed and a keypad is available to enter the PIN. When a PIN is entered manually by the card user, the number is checked against the PIN stored in memory 203 of card 100. If the numerical sequences are different, sales/transaction terminal 307 asks for the PIN again in case it was mistyped or partially forgotten. The card user is allowed to have a maximum number of attempts which is stored on card 100, in this case three attempts, in order to enter the correct PIN before the card is returned. If the PIN number stored in memory 203 matches the number entered, the transaction continues.

In step 757, terminal 307 determines if card 100 has expired by comparing the expiration date stored in memory 201 of card 100 with the present date generated by timer 510. If the card has expired, the card's balance and renewals are set to a value of zero in step 753. The card is then either returned to the card user in step 755 or alternatively seized by terminal 307. If the card has not expired, the process goes to step 703.

In step 703, microprocessor 501 in sales/transaction terminal 307 compares the date of the last transaction stored in memory 201 of card 100 with the current date from timer 510. In accordance with an aspect of the invention, FCC computer reimburses the card user for the unused balance on card 100 if card 100 is not used in a 90 day period. The balance on card 100 is therefore assumed to have been credited back to the user after the 90 day period in accordance with the invention. With this assumption, the balance portion of accounting module 259 of memory 201 in card 100 is reset to a zero value in step 705. The "maximum number of renewals" value stored in memory 201 is preferably copied into the "number of renewals" portion of accounting module 259 of memory 201 in card 100 to allow the card user more renewals. The process then skips down to step 715.

In step 715, microprocessor 501 in sales/transaction terminal 307 determines if the price of the item selected is less than or equal to that of the balance stored in card 100. If the price is less than or equal to the balance, the balance is decreased on card 100 by the price amount in step 717, and a record of the transaction is stored in memory 506 of terminal 307. In step 718, the balance is read once again from card 100 into sales/transaction terminal 307 to verify the correct balance is stored in memory 201 of the card. Preferably, if the balance does not match the calculated balance in terminal 307, the correct balance is rewritten to card 100. This ensures a proper accounting of money spent. In step 719, display module 401 displays the new balance on card 100. In step 720, the value stored in the sequence number portion of transaction module 255 of memory 201 in card 100 is increased by one. In step 720a, terminal 307 transmits the transaction data including renewal information to acquirer computer 305 who receives the information and forwards that information to FCC computer 301.

If in step 715 the price of the item is greater than the balance stored on the card, the value stored in the number of renewals portion of accounting module 259 in memory 201 of card 100 is preferably compared to a value of zero in step 721. If the number of renewals does equal zero, then the balance is compared to zero in step 722. If the balance is zero, then the transaction is not allowed to proceed and the user is displayed a message such as "Card Empty", or "Card Needs to be Replenished" in step 722a. The card is then returned to the card user in step 724.

If the number of renewals equals zero but there is a balance of more than zero on the card, then the transaction is the final one allowed, and the balance is only increased to cover the amount of the purchase. This allows the transaction to be completed and reduces the level of reimbursements by leaving a balance of zero on card 100. In step 723, the difference between the price and remaining balance is added to the balance to ensure enough funds to purchase the item. The process then skips to 717 described above.

If the number of renewals is greater than zero, then the card user's card 100 has some remaining automatic renewals for a predetermined amount. The card balance is incremented in step 725 by the predetermined amount (in this example $25) by microprocessor 501 to allow sufficient funds for the purchase to be made. The "number of renewals" value in memory 201 of card 100 is reduced by one in step 727 after a renewal has been triggered. The incremented value stored in card 100 is then decreased by the price of the item in sales/transaction terminal 307 and this new value is written back onto card 100 in the balance portion of accounting module 259 of memory 201 in step 717.

FIG. 8A shows the process employed in FCC computer 301 upon an automatic renewal. In step 801, FCC computer 301 receives data from acquirer computer 305 regarding the transaction at sales/transaction terminal 307 via transmission line 313. In step 803, FCC computer 301 identifies from the transmitted data the account number of card 100 and determines from the amount of the transaction and the previous balance on the user's card that there was an automatic renewal. FCC computer 301 then transmits renewal data information in step 805 to the card issuer computer 303 via transmission line 309.

FIG. 8B describes part of the process employed in the card issuer computer 303. In step 807, issuer computer 303 receives the data regarding the renewal from FCC computer 301. In step 809, issuer computer 303 stores the renewal data pertaining to the corresponding account number. Issuer computer 303 then periodically bills the card user associated with the account number $25, the predetermined level, for each renewal in step 810. In step 811, issuer computer 303 then transfers the money billed to the card user to a "float" account, i.e. the Pooled Account, in which money is placed initially to be paid out over time for reconciliation.

More specifically, the vendor forwards records of the transactions conducted at terminal 307 which are contained in memory 507. The vendor can either submit the printouts of the records to an acquirer bank, or electronically transmit the records to acquirer computer 305 through modem 511. The vendor is paid by the acquirer bank for the total amount spent at terminal 307 possibly less a financial card company fee. The acquirer bank then reports the transaction information, including at least the account number and the transaction amount, to FCC computer 301.

FIG. 8C describes a further process involving FCC computer 301. In step 813, FCC computer 301 receives the transaction data from the acquirer bank. In step 815, FCC computer 301 analyzes the data and stores it in a central database; the user's account balance is adjusted by the amount of the transaction. If FCC computer 301 determines that there was a renewal, the process proceeds as described above (steps 805–811). In step 817, FCC computer 301 pays the appropriate acquirer bank preferably the money that bank advanced the vendors through any available network connecting the banks, such as Banknet. In step 819, FCC computer 301 collects the amount paid to the acquirer bank from the appropriate issuer bank's "float" account. The central database controlled by FCC computer 301 contains data of all transactions in the system and allows for accountability of processed as well as unprocessed transactions.

Figure 9:
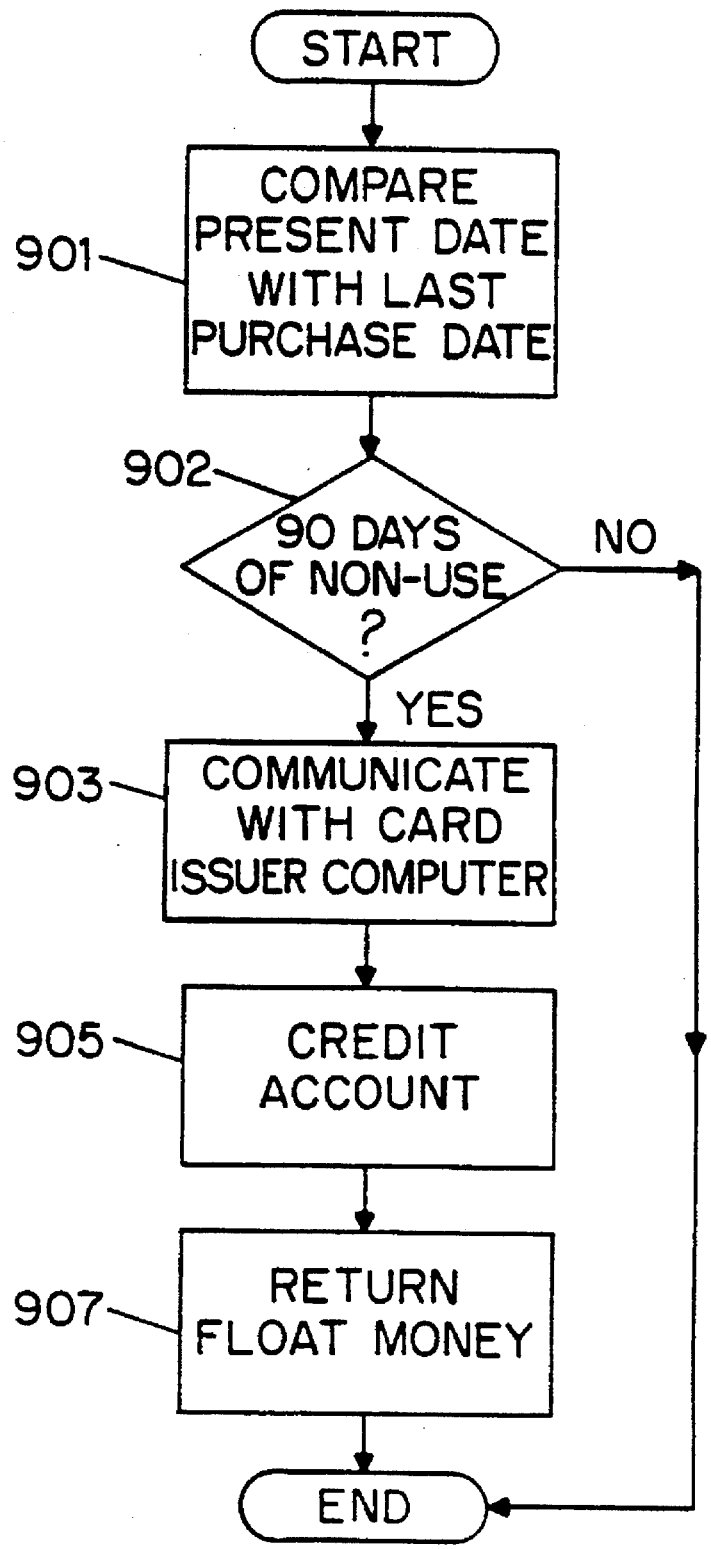
FIG. 9 is a flow chart illustrating a process for crediting to a card user unused funds on the card in accordance with an aspect of the invention.

FIG. 9 describes the credit-back process implemented in FCC computer 301 after a certain period (preferably 90 days) of no card activity. This ensures the card user does not lose the unspent money remaining on card 100 which is problematic in other systems such as a transportation card system. Other systems have card balances that can only be reduced by spending it in the closed system associated with the card. Thus cards that are lost or stolen or simply unused for other reasons are not refundable for the remaining balance. The present invention allows the card user to recover unspent money through the credit back system. In step 901, FCC computer 301 compares the present date with the date of the last purchase associated with card 100 stored in its database and determines if the account has not been active for longer than 90 days. If card 100 has been used in that period in step 902, FCC computer 301 takes no action. If card 100 has not been used for more than 90 days in step 902, then FCC computer 301 communicates with card issuer computer 303 via transmission line 309 in step 905 that the account should be credited with its outstanding balance. Card issuer computer 303 credits the card user's account with the outstanding balance accordingly. In step 907, FCC computer 301 directs the card issuer to withdraw the amount of the credit-back from the "float" to compensate for the credit. The period of time can be selected as "card expiration" to have no credit-backs associated with the card if desired.

The functionality of work space module 261 will now be described. As mentioned before, work space module 261 stores data pertaining to on-going transactions when the transaction amount is distance dependent or time dependent. An example of a distance dependent transaction is collection of tolls based on the distance traveled on a highway. When the card user initially enters the highway, he inserts card 100 into a terminal in the form of a toll machine. Data representing the point of entry is temporarily stored in card 100's work space module 261 of memory 201. When the card user exits the highway, this data is read by a second terminal which determines the point of entry based on the data stored temporarily and calculates the appropriate toll. The toll would then be charged to the balance on IC card 100 according to the process in FIG. 7.

Work space module 261 has sufficient memory to allow multiple data pertaining to on-going transactions to be stored simultaneously. Thus, for example, while driving on a highway the card user may make a phone call with card 100 that stores the start time of the phone conversation. When the card user finishes the phone transactions, the phone terminal calculates the charge based on the stored start time and reduces the balance on card 100 according to the process in FIG. 7. Other transactions such as the purchase of a soda, candy bar or gas may also take place. These operations would require storage of temporary data pertaining to multiple on-going transactions.

FIG. 10 illustrates a statement generated every month of all transactions made using the cashless system for card 100. The statement is sent from card issuer to card user to describe the purchases made. This preferred embodiment details date of purchase 1001, amount spent 1003 and type of sales/transaction terminal 1005. The detailed statement may be part of the card user's regular credit card bill or may be made sent only if requested by the card user.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, a person skilled in the art may improve magnetic stripe 111 on the back of the card 100 to also contain the data presently stored in memory 201. In that case, the magnetic stripe would serve as the sole storage device on card 100. The magnetic stripe refers to the conventional Track 1 or Track 2 magnetic stripe data as encoded on current bank cards in accordance with standards promulgated by the American Bankers Association, the American National Standards Institute, and the International Standards Organization. Track 3 parameters would be defined by the financial card company in accordance with this invention. One drawback of using only a magnetic stripe for data storage is its susceptibility to demagnetization and the potential loss of data when the card is placed near a magnetic field.

Alternatively, memory 201 could replace magnetic stripe 111 to also contain the magnetically stored data needed to conduct conventional credit card transactions. This would eliminate the problem of losing data when accidentally placed near a magnetic field.

In addition, card 100 could contain additional memory modules containing balances for different foreign currencies. This would allow world-wide utilization of the system by keeping separate balances each of which would be renewable. The predetermined value of the foreign currency would likewise be small and preferably in an amount equivalent to U.S. $25. The memory modules could contain associated "credit back" memory locations to allow different time periods for credit-backs for each foreign currency. The memory modules could also contain individual "maximum number of renewals" and "number of renewals remaining" portions of accounting modules associated with each currency.

Furthermore, the system could have a different threshold to activate the automatic renewal feature. For example, the balance could be automatically increased by a predetermined sum each time the card's balance goes below one dollar rather than zero dollars as in the present illustrative embodiment.

In addition, it may be desirable to remove the above described feature of forcing the last transaction to completion. That is, the system returns the card whenever the number of renewals is zero and the balance is less than the price of the desired items regardless of whether the balance is non-zero. This would remove the feature of covering the last transaction described above but would make the system easier to implement.

Finally, the present invention has been described and disclosed in a form in which the various system functions are performed by discrete functional blocks. However, any one or more of these functions could equally well be performed by one or more appropriately programmed microprocessors, micro-coded chips, etc.

I claim:

1. Financial card apparatus comprising:

first means for providing first data representing an available fund for cashless transactions;

second means for providing second data in said card apparatus representing a number of renewals, each of which represents an increase of a predetermined amount to said available fund; and third means for providing third data identifying an account for billing, said account associated with said financial card apparatus;

whereby an increase in said available fund is accompanied by a change in said number of renewals, and whereby upon said change said account is billed for an amount which is a function of said predetermined amount and said change in said number of renewals.

2. The card apparatus of claim 1 wherein the first and second means include a memory for storing the first and second data.

3. The card apparatus of claim 2 wherein said memory is an electrically erasable programmable read-only-memory (EEPROM).

4. The card apparatus of claim 1 wherein the first and second means include magnetic storage means for storing the first and second data.

5. The card apparatus of claim 1 further comprising fourth means for providing fourth data representing a selected period of inactivity, said available fund being redeemable after said period elapses.

6. The card apparatus of claim 1 further comprising fourth means for providing fourth data on a maximum number of said renewals.

7. The card apparatus of claim 1 wherein when said available fund falls below a predetermined threshold, said available fund is increased by said predetermined amount to complete a particular cashless transaction.

8. The card apparatus of claim 7 wherein said predetermined amount is the difference between the amount of said particular cashless transaction and said available fund.

9. The card apparatus of claim 8 wherein when said number of renewals equals zero and said available fund equals zero, no increase in said available fund is allowed to complete said particular cashless transaction.

10. Terminal apparatus for conducting a cashless transaction comprising:
    means for receiving a card apparatus containing data representing at least a number of renewals and an available fund for said cashless transaction;
    means for reading said data from said card apparatus;
    means responsive to at least said data for increasing said available fund and causing said number of renewals to be changed; and
    means for processing said cashless transaction.

11. The terminal apparatus of claim 10 wherein said available fund is increased when said available fund falls below a predetermined threshold amount.

12. The terminal apparatus of claim 11 wherein said available fund is increased by a predetermined fund amount when said available fund is less than said predetermined threshold amount and said number of renewals falls within a predetermined set of numbers.

13. The terminal apparatus of claim 12 wherein each renewal represents an increase of said predetermined fund amount to said available fund, and wherein said number of renewals is changed by one when said available fund is increased.

14. The terminal apparatus of claim 13 wherein said number of renewals is decreased when said available fund is increased.

15. The terminal apparatus of claim 14 wherein said available fund is unchanged when said number of renewals is zero and said available fund is zero.

16. The terminal apparatus of claim 10 further comprising means for communicating to a remote processor second data representing an account number associated with said card apparatus, and an amount of said cashless transaction.

17. The terminal apparatus of claim 16 wherein said second data further represents a card number associated with said account number, said available fund, an expiration date associated with said account number and a transaction sequence number associated with said card.

18. The terminal apparatus of claim 10 further comprising means for recording information which is a function of the transaction onto said card apparatus.

19. The terminal apparatus of claim 18 wherein said information includes values of said available fund and the number of renewals.

20. The terminal apparatus of claim 10 wherein said data includes an account number associated with said card apparatus, said terminal apparatus further comprising:
    means for storing a list of selected account numbers;
    means for comparing said account number against said list; and
    means for determining whether said account number is within said list.

21. The terminal apparatus of claim 20 further comprising means for receiving said list of selected account numbers through a communications link.

22. The terminal apparatus of claim 20 further comprising means for retaining said card apparatus when determined to be within said list.

23. The terminal apparatus of claim 10 wherein said data includes an expiration date associated with said card apparatus, and said terminal apparatus further comprising means for comparing the date of said transaction with said expiration date.

24. The terminal apparatus of claim 10 further comprising means for providing second data representing a selected period of inactively, means for determining whether the selected period has elapsed, and means for adjusting said available fund to zero after said selected period is determined to have elapsed.

25. The terminal apparatus of claim 10 wherein said processing means includes means for providing a sequence number to index each cashless transaction.

26. The terminal apparatus of claim 10 wherein an amount of said cashless transaction is expressed in a selected one of different currencies.

27. A system for conducting a cashless transaction comprising:
    at least one user card apparatus containing data representing at least a number of renewals and an available fund for said cashless transaction;
    at least one terminal apparatus including (a) means for receiving said user card apparatus; (b) means for reading said data from said card apparatus; (c) means responsive to at least said data for increasing said available fund and causing said number of renewals to be changed and (d) means for processing said cashless transaction; and
    means for collecting from said terminal apparatus information about said cashless transaction.

28. The system of claim 27 wherein said available fund is increased when said available fund falls below a predetermined threshold amount.

29. The system of claim 28 wherein said predetermined threshold amount equals the amount of said transaction.

30. The system of claim 29 wherein said available fund is increased by a predetermined fund amount when said available fund is less than a predetermined threshold amount and said number of renewals falls within a predetermined set of numbers.

31. The system of claim 30 wherein each renewal represents an increase of said predetermined fund amount to said available fund, and wherein said number of renewals is changed by one when said available fund is increased.

32. The system of claim 31 wherein said number of renewals is decreased when said available fund is increased.

33. The system of claim 28 wherein when said number of renewals is zero, said available fund is increased by the difference between said available fund and the amount of said transaction to complete the transaction.

34. The system of claim 33 wherein when said number of renewals is zero and said available fund is zero, said available fund is not increased resulting in an incomplete transaction.

35. The system of claim 27 further including means for billing said user a predetermined sum upon a change in said number of renewals.

36. The system of claim 35 wherein said means for billing includes means for determining that a change in said number of renewals has occurred.

37. The system of claim 36 wherein said number of renewals is changed when said predetermined sum is added to said available fund.

38. The system of claim 37 wherein said predetermined sum is added to said available fund when said available fund is less than the amount of the transaction.

39. The system of claim 35 wherein upon said billing said predetermined sum is added to a pooled account.

40. The system of claim 39 further including means for reimbursing the amount of said transaction out of said pooled account.

41. The system of claim 35 wherein said terminal further includes means for recording information on said card apparatus which information is a function of the transaction.

42. The system of claim 41 wherein said information includes a new account balance which equals said available fund less the amount of the transaction plus, in the event of a change in said number of renewals, said predetermined sum.

43. The system of claim 42 wherein said information further includes a new number of renewals which equals said number of renewals less one in the event there has been said change in said number of renewals.

44. A method for conducting a cashless transaction with a user card apparatus comprising the steps of:

providing data in said user card apparatus representing at least a number of renewals and an available fund for said cashless transaction;

increasing said available fund in response to at least said data;

causing said number of renewals to be changed when said available fund is increased; and processing said cashless transaction.

45. The method of claim 44 further comprising the steps of:

increasing said available fund a predetermined amount in the event said available fund is less than the amount of the transaction;

subtracting from said available fund the amount of said transaction to equal a new balance;

recording said new balance on said card apparatus; and completing said cashless transaction.

46. The method of claim 45 wherein said increase to said available fund only occurs in the event said number of renewals is within a predetermined set of numbers.

47. The method of claim 45 wherein said predetermined amount is the difference between the amount of said transaction and said available fund in the event said number of renewals equals zero.

48. The method of claim 45 wherein said increase to said available fund does not occur if said available fund is zero and said number of renewals is zero.

49. The method of claim 45 further comprising the step of changing the number of renewals upon an increase to said available fund.

50. The method of claim 49 further including the steps of providing an account associated with said card apparatus; and billing said account an amount which is a function of said predetermined amount and said change in said number of renewals.

51. The method of claim 50 further including the steps of creating a pooled account; and reimbursing out of said pooled account the amount of said transaction.

52. The method of claim 51 wherein said pooled account is increased the amount billed to said accounts.

53. The method of claim 51 wherein:

said creating step occurs at a bank which issues said card apparatus; and wherein said reimbursing step includes:

having an acquirer bank pay the amount of said transaction to an account associated with said terminal;

having a financial card company pay said acquirer bank the amount of said transaction;

reimbursing said financial card company out of said pooled account, the amount of said transaction.

54. The method of claim 44 wherein said providing step includes the step of storing temporary data representative of another cashless transaction.

* * * * *